US009126267B2

(12) United States Patent
Lund et al.

(10) Patent No.: US 9,126,267 B2

(45) Date of Patent: Sep. 8, 2015

(54) ROD-SHAPED TOOL HOLDER FOR ATTACHING CUTTING BITS AT NODES

(75) Inventors: Even Lund, Jakobsli (FI); Martin Saeterbo, Spongdal (NO); Tormod Jensen, Ranheim (NO)

(73) Assignee: Teeness ASA, Trondheim (NO)

( * ) Notice: Subject to any disclaimer, the term of this patent is extended or adjusted under 35 U.S.C. 154(b) by 234 days.

(21) Appl. No.: 13/696,805

(22) PCT Filed: May 6, 2011

(86) PCT No.: PCT/EP2011/057263

§ 371 (c)(1), (2), (4) Date: Nov. 8, 2012

(87) PCT Pub. No.: WO2011/141360

PCT Pub. Date: Dec. 17, 2011

(65) Prior Publication Data

US 2013/0058733 A1 Mar. 7, 2013

(30) Foreign Application Priority Data

May 10, 2010 (NO) .................................... 20100670

(51) Int. Cl.

*B23B 29/02* (2006.01)

*B23B 29/12* (2006.01)

(52) U.S. Cl.

CPC ............. *B23B 29/022* (2013.01); *B23B 29/125* (2013.01); *B23B 2260/068* (2013.01); *Y10T 407/22* (2015.01); *Y10T 408/76* (2015.01)

(58) Field of Classification Search

CPC .. B23B 29/022; B23B 29/125; B23B 2229/00

USPC ........ 408/143; 407/66, 102, 103; 82/158, 904

See application file for complete search history.

(56) References Cited

U.S. PATENT DOCUMENTS

| | | | | |
|---|---|---|---|---|
| 3,739,665 | A * | 6/1973 | Kumabe et al. | 82/106 |
| 4,620,121 | A * | 10/1986 | Mishiro | 310/323.18 |
| 4,911,044 | A * | 3/1990 | Mishiro et al. | 82/158 |
| 5,170,103 | A * | 12/1992 | Rouch et al. | 318/128 |
| 5,218,893 | A * | 6/1993 | Shikata | 82/1.11 |
| 6,694,213 | B2 * | 2/2004 | Claesson et al. | 700/169 |
| 7,647,853 | B2 * | 1/2010 | Lundblad | 82/1.11 |
| 2006/0291973 | A1 * | 12/2006 | Claesson et al. | 409/234 |
| 2007/0101839 | A1 | 5/2007 | Travez | |
| 2007/0180961 | A1 | 8/2007 | Imai | |
| 2010/0172708 | A1 * | 7/2010 | Bolin et al. | 409/131 |

FOREIGN PATENT DOCUMENTS

| | | | |
|---|---|---|---|
| WO | 200025964 | A1 | 5/2000 |
| WO | 2005042195 | A1 | 5/2005 |

* cited by examiner

*Primary Examiner* — Daniel Howell

*Assistant Examiner* — Chwen-Wei Su

(74) *Attorney, Agent, or Firm* — Corinne R. Gorski

(57) ABSTRACT

The present invention relates to a rod-shaped tool holder (1) having a length (l) for the attachment of at least one machining cutting bit (2). The tool holder (1) is configured for being clamped at a first end (4) and has a second free end (3) and optionally a secondary support between the clamping point (4) and the at least one cutting bit (2). In operation, the tool holder oscillates in higher order bending oscillations about at least one node (6) located on a curvilinear axis (x) extending from the first end. The at least one cutting bit (2) is positioned substantially at the node (6) in a distance from the free end (3), towards the first end (4).

12 Claims, 3 Drawing Sheets

3 2 1 5 4 6

ROD-SHAPED TOOL HOLDER FOR ATTACHING CUTTING BITS AT NODES

RELATED APPLICATION DATA

This application is a §371 National Stage Application of PCT International Application No. PCT/EP2011/057263 filed May 6, 2011 claiming priority of Norweigian Application No. 2010 0670, filed May 10, 2010.

The present invention relates to a rod-shaped tool holder used in machine tools, in particular for chip-removing machining, and in this connection especially large overhang internal turning. In this context, the term overhang typically refers to the distance between the attachment point of the tool holder and the location of the cutting bit. Large overhangs are necessary in internal machining in deep work pieces, for example. The invention may also be used in connection with other forms of machining in which a rod-shaped tool holder is used, and may be used for tool holders holding several cutting bits. In such machining, oscillations are generated in the rod, which is a problem since the oscillations cause the cutting bit to move relative to the work piece to be machined. This reduces the dimensional tolerances and achievable surface finish, and may even result in noise and failure. Typical applications for such machining are within the car industry, airplane industry, energy sector, and for oil and gas recovery equipment.

In order to reduce such vibrations it is common to use dampers in the rod, and through the use of such dampers, the overhang length can be increased, typically in the order of up to 12×D, where D is the rod diameter.

For particularly large overhangs, higher order bending oscillations in the rod become more dominating, and such oscillations are difficult to damp. In this context, higher order bending oscillations means that the rod-shaped tool holder oscillates about a centre line and crosses this line at several points in each oscillatory cycle. These points are referred to as nodes. These vibrations cause a displacement, $u^{\omega}(x, t)$, of the tool holder which depends on the position along the x axis, time, and oscillation mode, and which affect the position of the cutting bit. In practice, this limits the maximum usable overhang length.

By positioning the cutting bit as suggested according to the present invention the overhang length can be increased significantly with no reduction of the dimensional tolerances or surface quality achievable by machining.

A damper may be provided in front of the cutting bit, and can be inserted in a thin-walled cross-section. The cutting bit may be placed at or nearby a node of the second resonance frequency. In this context, the node of the second resonance frequency refers to the first node following the attachment point at which the tool holder axis oscillates about a rectilinear centre axis through the tool holder. This is the point at which $u^{\omega 2}(x, t)$ is at its minimum. This has given good results for large overhangs. The damper will act on the first resonance frequency and partly higher order oscillation modes. The point at which to attach the cutting bit can be calculated analytically, through a finite element analysis, or be measured using modal analysis. Modal analysis measurements may be carried out subsequently in order to place the node exactly at the attachment point of the cutting bit.

Hence, the present invention defines a rod-shaped tool holder having a length l for the attachment of at least one machining cutting bit. The tool holder is configured for having a main attachment point at a first end, and optionally a secondary support against the work piece being machined, and has a second, free end. In operation, the tool holder oscillates in higher order flexural modes about at least one node located on a rectilinear axis (x) running from the first end thereof. The at least one cutting bit is positioned substantially at the node in a distance from the free end, towards the first end.

The distance between the first end of the tool holder and the at least one cutting bit may be in the order of 0.78 l-0.91 l. This distance is typical for homogenous rods. However, a tool may be comprised of various materials and excavations, and many factors may influence the actual value. In other words, the actual values may differ from the above values.

An oscillation damper may be provided between the free end of the holder and the at least one cutting bit.

A secondary support may be provided between the at least one cutting bit and the main attachment point.

The at least one cutting bit may be positioned in the node of second order oscillations.

The at least one cutting bit may be positioned in the node(s) of third order oscillations.

The at least one cutting bit may be positioned in the node(s) of fourth order oscillations.

The tool holder may have a diameter D, and the at least one cutting bit may be positioned in a distance of at least 10×D from the first end, or the secondary support.

The tool holder may further comprise a secondary support between the at least one cutting bit and the first end. The at least one cutting bit may be positioned in a distance of at least 10×D from the secondary support.

The tool holder may further allow for one or more cutting bits to be disposed at each node. Such bits can be positioned in different positions around the circumference of the tool at the nodes.

The tool holder may be operated in higher order oscillation modes, so that at least two nodes are formed. Cutting bits may be positioned at or nearby at least two of these nodes. For example, if there are three nodes, cutting bits may be positioned at one, two, or possibly all three of these nodes. Normally, cutting bits will be positioned at the node closest to the free end of the tool holder in order to allow for machining to be performed with the largest overhang possible. Also, two, three or more cutting bits may be positioned at each node. For example, when having three nodes and three cutting bits at each node, there are a total of nine cutting bits. It is not necessary, however, to have the same number of cutting bits at each node.

BRIEF DESCRIPTION OF THE ACCOMPANYING DRAWINGS

DETAILED DESCRIPTION OF THE PRESENT INVENTION WITH REFERENCE TO THE ACCOMPANYING DRAWINGS

Figure 1:
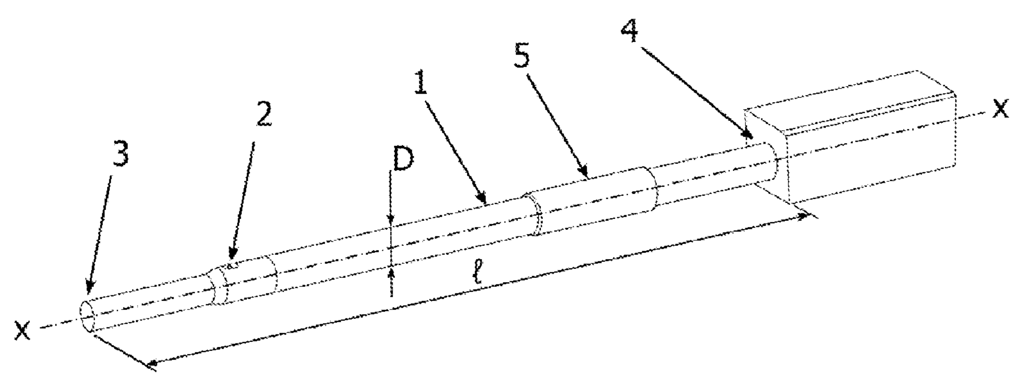
FIG. 1 shows a tool holder holding a cutting bit according to the invention.

In FIG. 1 a rod-shaped tool holder 1 is shown extending between a first end 4 at which the tool holder 1 is clamped to a machine tool, a support 5 against the work piece (not shown), and a second, free end 3 at which the tool holder is not fastened. FIG. 1 shows the configuration of the tool holder 1 when not in operation, having an axial centre axis. A cutting bit 2 is attached to the tool holder 1 at an inward distance from the free end 3. The free end 3 may include an oscillation damper and may have the form of a sleeve. In that case, the cutting bit will be attached between the first end 4 and the damper. The oscillation damper may be a damper having a flexibly fastened damping mass, for example, or may be an active damper, e.g. comprising piezoelectric or electro-dynamic elements. However, the free end of the tool holder may also only include a mass. This mass can be a fixed weight mass or may include replaceable weights for adjustment or "tuning" of the assembly. The distance between the free end 3 and the cutting bit may also be adjusted either by moving the cutting bit or by creating an adjustable length assembly between the cutting bit and the free end 3. The assembly may also include means for adjustment during operation and may include actuators for moving a mass along an axis between the free end 3 and the cutting bit. Alternatively, the distance between the cutting bit 2 and the free end 3 can be adjusted by way of one or more actuators. Sensors, such as accelerometers, load cells, or strain gauges, for example, may be used for determining the nodes and hence the attachment point for the cutting bit. The rod-shaped tool holder 1 may also include several cutting bits. For example, if the tool holder oscillates in the third order natural oscillation mode so that two nodes are formed, the cutting bits can be positioned at these nodes.

Figure 2:
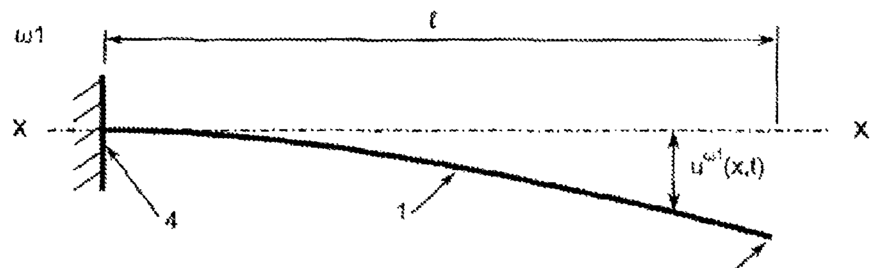
FIG. 2 is a schematic view of a tool holder, in a first lateral oscillation mode.

FIG. 2 is a schematic diagram of a tool holder 1, depicted as a uniform cantilever beam clamped at a first end 4. The tool holder 1 has a length l and is shown in a first deflection mode ω1. In this first deflection mode, the invention cannot be used as this deflection mode does not exhibit any nodes. A rectilinear axis x runs from the clamping point at the first end 4.

Figure 3:
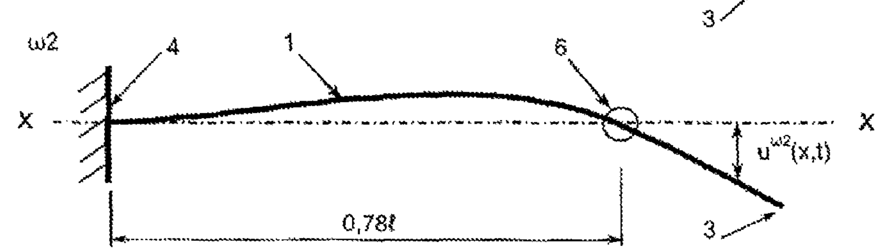
FIG. 3 shows a tool holder in a second lateral oscillation mode.

FIG. 3 shows a tool holder 1, which like the one in FIG. 2, is depicted as a uniform beam of length l being clamped at a first end 4 and having a free end 3. The tool holder is shown in a second deflection mode ω2 exhibiting a node 6 at 0.78 l, which node 6 will be suited for the placement of a cutting bit for this case. (The distance 0.78 l is measured from the first end 4 at which the tool holder is clamped and to the location of the cutting bit 2.) If the tool holder 1 is comprised of different materials and/or has a heterogeneous configuration or a secondary support, the node 6 will differ slightly in position from the illustrated value 0.78 l.

Figure 4:
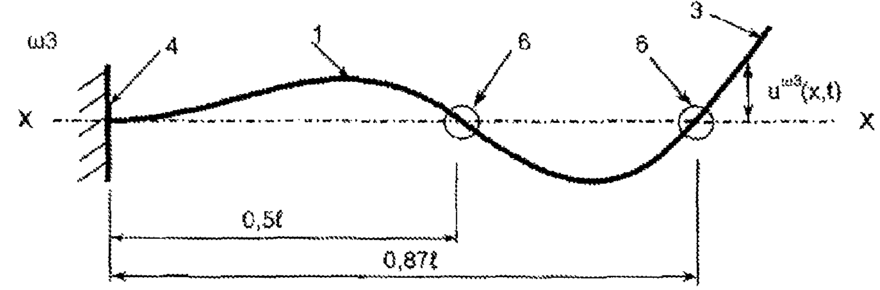
FIG. 4 shows a tool holder in a third lateral oscillation mode.

FIG. 4 is a schematic diagram of a tool holder 1 similar to those in FIGS. 2 and 3, having length l and being clamped at a first end 4 and having a free end 3, in a third order deflection mode ω3 for which two nodes 6 exist on tool holder 1. These nodes 6 are suited for the attachment of a cutting bit. The first node is located at 0.50 l and the second node is located at 0.87 l. Typically, the cutting bit will be positioned at the outermost node.

Figure 5:
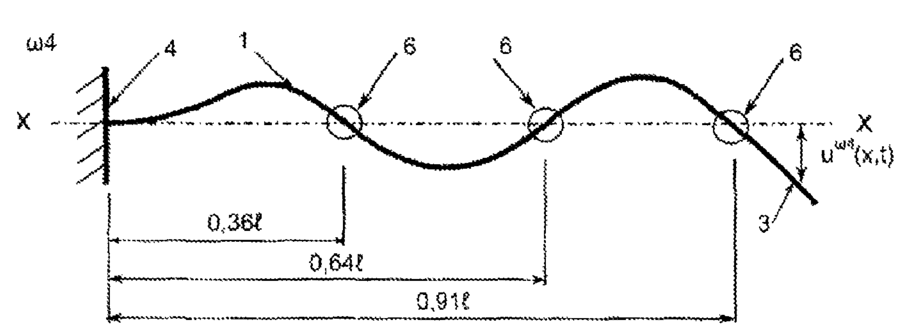
FIG. 5 shows a tool holder in a fourth lateral oscillation mode.

FIG. 5 is a schematic diagram of a tool holder 1, similar to those in FIGS. 2, 3, and 4, having length l and being clamped at a first end 4 and having a free end 3. Tool holder 1 is shown in a fourth order deflection mode ω4, for which three nodes 6 exist located at 0.36 l, 0.64 l, and 0.91 l, respectively. Typically, the cutting bit will be positioned at the outermost node at 0.91 l.

Figure 6:
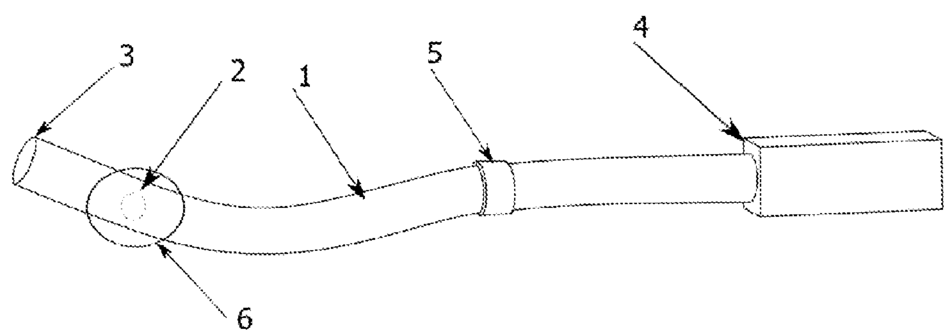
FIG. 6 shows a tool holder in a second lateral oscillation mode, and having a secondary support according to the invention.

FIG. 6 shows a tool holder 1 according to the invention in a second lateral deflection mode. The tool holder 1 is shown with a first clamped end 4 and includes a secondary support 5, a second, free end 3, and a cutting bit 2 at a node 6. The figure shows, somewhat exaggerated, how the shape of the tool holder 1 changes in operation. The support 5 against the workpiece moves the node 6 towards the free end 3. This can be seen in that the second lateral deflection mode of the tool holder 1 produces a section between the first end 4 and the support 5 that is less affected by the mode shape (substantially straight). Between support 5 and the free end 3 the centre axis will depart from a straight shape. The support 5 against the workpiece may be comprised of bearing surfaces between the workpiece and the support, or between tool holder 1 and support 5. Of course, support 5 is not always necessary.

The invention claimed is:

1. A rod-shaped tool holder having a length l for the attachment of at least one cutting bit for machining, the tool holder comprising:

a first end and a second end, the tool holder being arranged to be clamped at the first end and free at the second end, and, in operation, for oscillating in higher order bending oscillations about at least one node located on a rectilinear axis running from the first end, wherein the at least one cutting bit is positioned substantially at the at least one node at a distance from the second end towards the first end.

2. The rod-shaped tool holder of claim 1, wherein the distance between the first end and the at least one cutting bit is about 0.78 l-to about 0.91 l.

3. The rod-shaped tool holder of claim 1, wherein a vibration damper is positioned between the second end and the at least one cutting bit.

4. The rod-shaped tool holder of claim 1, wherein the at least one cutting bit is positioned at the at least one node for second order oscillations.

5. The rod-shaped tool holder of claim 1, wherein the at least one cutting bit is positioned at the at least one node for third order oscillations.

6. The rod-shaped tool holder of claim 1, wherein the at least one cutting bit is positioned at the at least one node for fourth order oscillations.

7. The rod-shaped tool holder of claim 1, wherein the tool holder has a diameter D, and the at least one cutting bit is positioned at a distance of at least 10×D from the first end.

8. The rod-shaped tool holder of claim 1, further comprising a secondary support located between the at least one cutting bit and the first end.

9. The rod-shaped tool holder of claim 8, wherein the at least one cutting bit is positioned at a distance of at least 10×D from the secondary support.

10. The rod-shaped tool holder of claim 1, wherein one or more cutting bits are positioned at the at least one node.

11. The rod-shaped tool holder of claim 1, wherein for operation in higher order deflection modes at least two nodes are formed, and wherein at least one cutting bit is positioned substantially at each of the at least two nodes.

12. The rod-shaped tool holder of claim 11, wherein at least two cutting bits are positioned substantially at each of the at least two nodes.

* * * * *